A. J. BURKE.
TOOL.
APPLICATION FILED APR. 6, 1920.
1,387,234.
Patented Aug. 9, 1921.
Fig. 1.
Fig. 2.
Fig. 3.
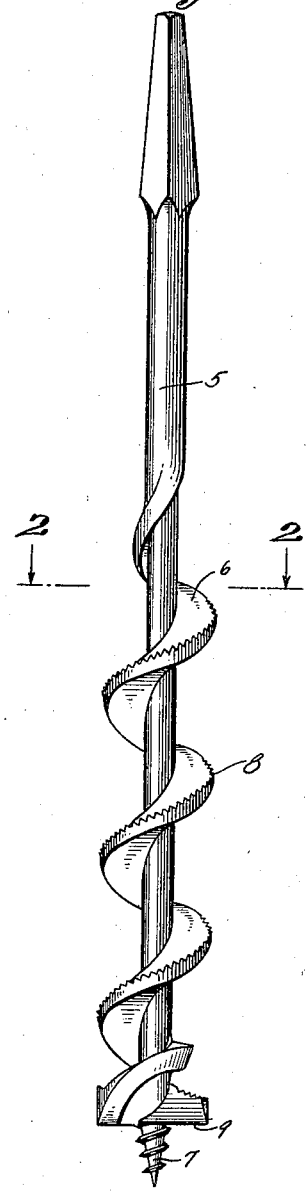
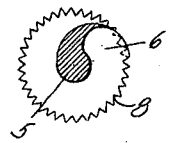
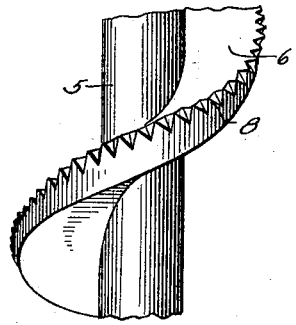
WITNESSES
H. C. Hebig
INVENTOR
A. J. Burke,
BY Munn & Co
ATTORNEYS

UNITED STATES PATENT OFFICE.

ANDREW JACKSON BURKE, OF NEW HAVEN, CONNECTICUT.

TOOL.

1,387,234. Specification of Letters Patent. Patented Aug. 9, 1921.

Application filed April 6, 1920. Serial No. 371,700.

*To all whom it may concern:*

Be it known that I, ANDREW J. BURKE, a citizen of the United States, and resident of New Haven, in the county of New Haven and State of Connecticut, have invented a new and Improved Tool, of which the following is a full, clear, and exact description.

It is well appreciated in connection with the use of augers, and auger-bits that great difficulty is experienced in boring through seams or season-checks, in view of the fact that the chips or borings lodge in the seams or checks and clog the auger. This necessitates a reversal of the turning of the brace, and a partial withdrawing of the auger.

This operation must generally be repeated a number of times during one boring, resulting in the waste of a great amount of time and operation on the part of the operator.

With a view of overcoming this defect, I have now designed an improved auger or auger-bit by means of which this difficulty will be overcome in that the chips or borings will be entirely removed from the scene while the auger is being operated, thus preventing the necessity of a reversal of turning on the part of the auger and frequent clogging of the same from the boring.

Reference is had to the attached sheet of drawings as illustrating one practical embodiment of my invention, and in which drawings, Figure 1 is a side view of an auger constructed in accordance with my invention.

Fig. 2 is a sectional view taken on the lines 2—2 of Fig. 1, and

Fig. 3 is an enlarged side view showing the construction employed in accomplishing my object.

In these views the reference numeral 5 indicates the usual auger shank, which is formed with the worm 6, the lower end of the shank terminating in the conventional bit 7.

Contrary to the conventional construction the side edges of the worm and more particularly the upper side edges are formed with a series of teeth 8, and it will be appreciated that upon the auger being actuated in the usual manner that the bit 7 will draw the cutting edge 9 of the worm into engagement with the substance to be bored.

A further rotation of the shank 5 will result in the worm penetrating and moving into the substance, and it will be appreciated that any chips or season-checks which normally interfere with the operation of the auger will be engaged by the teeth 8 which will sever them from that portion of the substance to be bored, to which they are attached, and these members will now be effectually removed from the bore.

Obviously this invention might be applied to any form of auger, and the teeth and general upper cutting edge of the worm 8 might be modified to conform to the particular requirements of the work for which it is intended.

What I claim as new is:

A boring tool including in combination with a shank a worm secured to said shank, and a bit at the lower end of said shank, of a series of teeth formed in the upper side edges of said worm.

ANDREW JACKSON BURKE.